June 5, 1951  C. M. ELLISON  2,555,438
COMBINED PLOW AND HARROW
Filed Oct. 19, 1946　　　　　　　　　　　　　　　　2 Sheets-Sheet 1
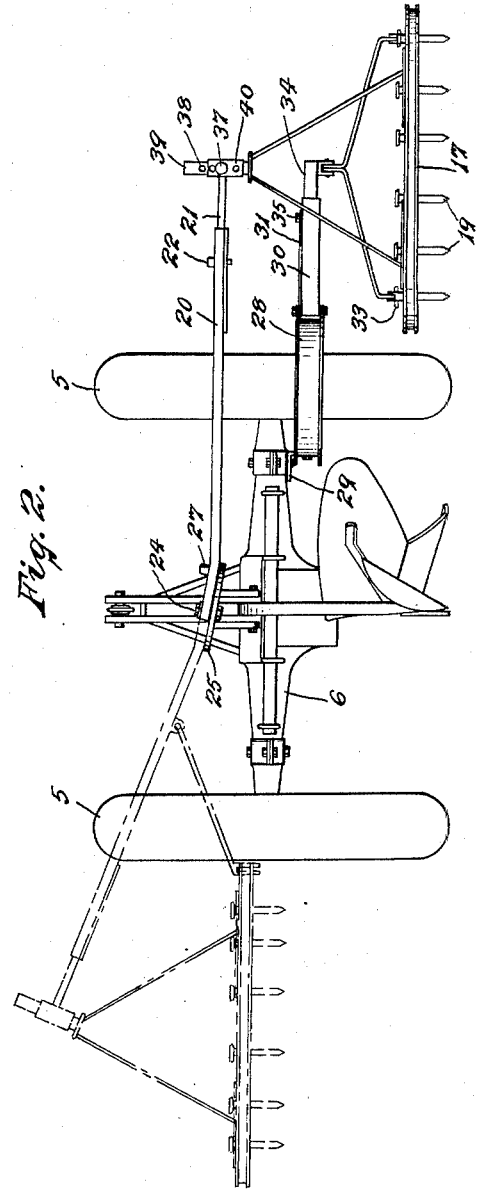
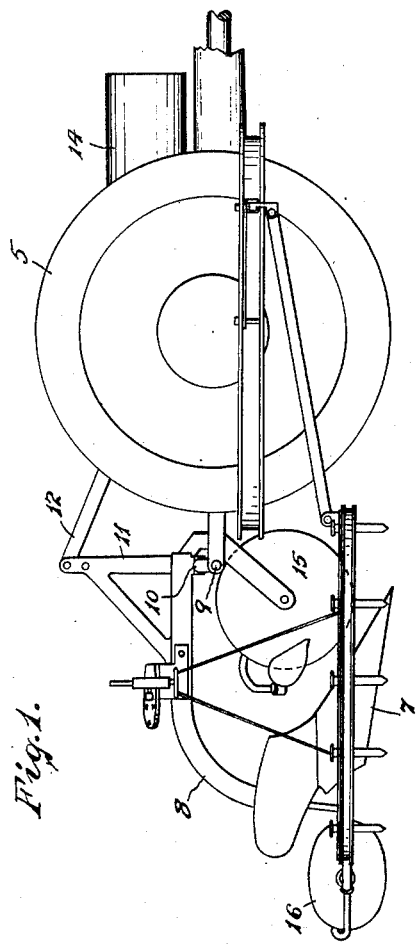
INVENTOR.
CLARENCE M. ELLISON
BY Louis V. Lucia
ATTORNEY.

June 5, 1951  C. M. ELLISON  2,555,438
COMBINED PLOW AND HARROW
Filed Oct. 19, 1946  2 Sheets-Sheet 2

INVENTOR.
CLARENCE M ELLISON
BY Louis V. Lucia
ATTORNEY.

Patented June 5, 1951

2,555,438

UNITED STATES PATENT OFFICE 2,555,438

COMBINED PLOW AND HARROW

Clarence M. Ellison, New Britain, Conn., assignor of one-half to Albin Holmquist, Kensington, Conn.

Application October 19, 1946, Serial No. 704,397

4 Claims. (Cl. 97—5)

This invention relates to an agricultural implement comprising a combined plow and harrow and more particularly to such an implement which is drawn by means of a conventional type tractor.

An object of this invention is to provide a mechanism whereby a harrow may be readily attached to and operated in combination with a plow.

A further object of the invention is to provide such an implement having a harrow operably supported at one side of a plow and operated in combination therewith to harrow a previously-formed furrow while the plow is forming a new furrow.

A still further object of this invention is to provide an implement which will plow and harrow an area of land without leaving any marks from the wheels of the tractor or other vehicle that is used for drawing said implement.

A still further object of this invention is to provide a harrow which is disposed for operating at one side of the vehicle wheel so that it will harrow a surface after the wheel has passed thereover and thereby leave no tracks from said wheel.

Further objects and advantages of this invention will be more clearly understood in the following description from the accompanying drawing in which—

Fig. 1 is an elevational side view of my improved combined plow and harrow, showing only a portion of a tractor to which it is connected.

Fig. 2 is an elevational rear view thereof.

Figure 3:
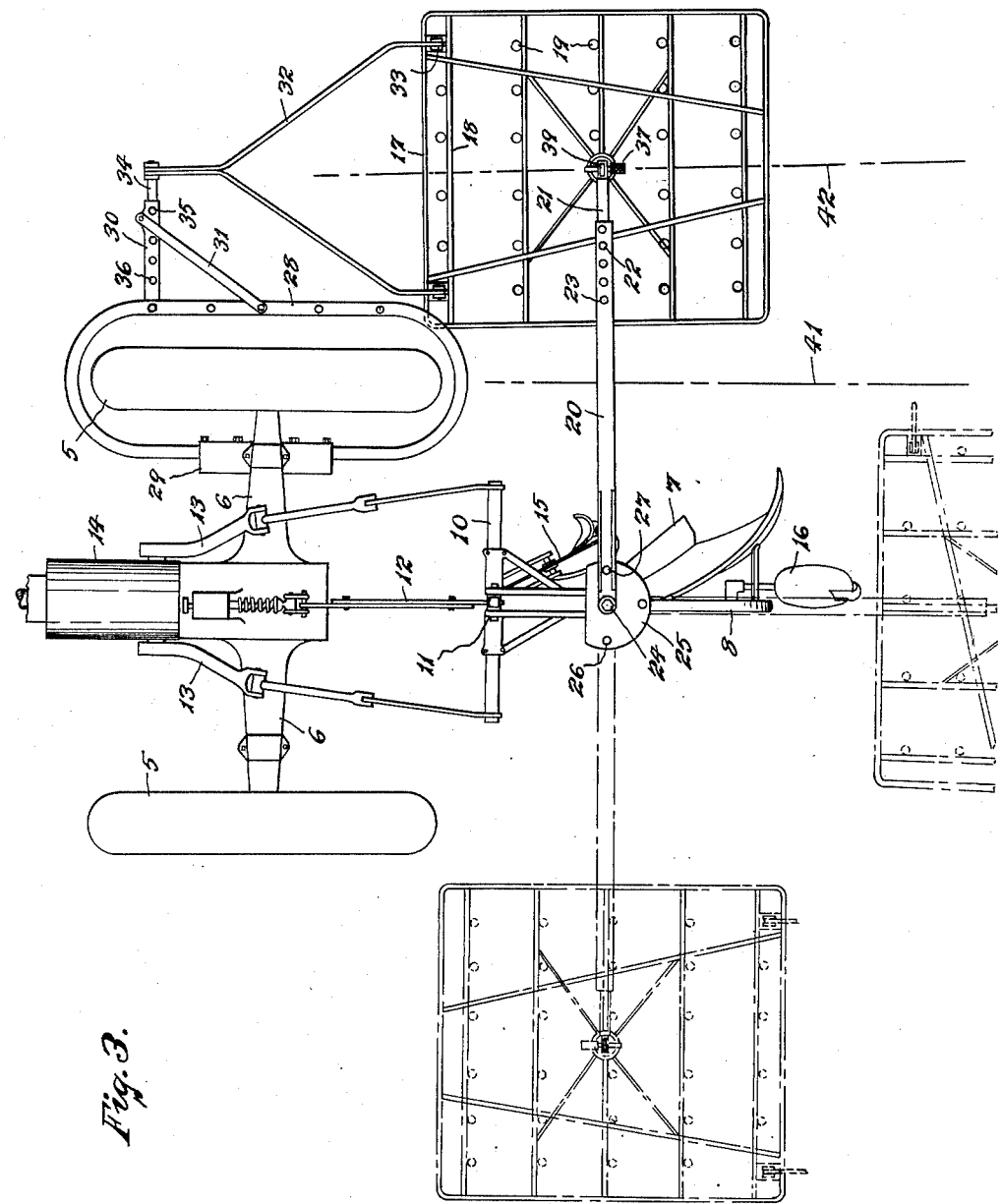
Fig. 3 is an elevational plan view of said combined plow and harrow showing, in dotted lines, the harrow in its various positions.

In the embodiment illustrated in the drawings, a mechanism comprising my invention is shown as attached to the rear of a conventional form of tractor having wheels 5—5 and an axle housing 6.

A plow 7 is carried at the end of an arm 8 which is movably mounted upon the said tractor by a conventional mechanism well known to those skilled in the art. This mechanism includes a bar 10, upon which the plow is carried, and a lever 11 projecting from said arm 8. It also includes levers 12 and 13 which are rendered operable, by movement of a piston within the cylinder 14, to raise and lower the harrow with the plow, as will be hereinafter described. Further description of this conventional mechanism is not believed necessary and therefore is omitted herefrom since it may be of common form well known to those skilled in the art and does not constitute a part of my present invention.

The said arm 8 carries therewith a front furrow disc 15 and a rear furrow disc 16 which are also commonly used in connection with such plows.

The present invention is directed particularly to the provision of a harrow of any suitable type and preferably of the toothed type such as shown in the drawings and which comprises a suitable frame 17 having a series of supporting bars 18 therein for supporting the teeth which, as shown, are in the forms of spikes 19 and detachably secured to said bars.

The said frame 16 is carried by a supporting bar 20 that has a sliding bar 21 adjustably connected therewith by means of a pin 22 which may be inserted through any one of the openings 23 for adjusting the said bar 20 for the particular length required to locate the harrow in the desired position relatively to the plow.

The bar 20 is pivoted at 24 upon a supporting plate 25 which is carried on the arm 8 and has a plurality of holes 26 therein for receiving a pin 27 to secure the bar 20 for holding the harrow frame 17 in various positions relative to the plow, as shown in dotted lines in Figs. 2 and 3.

The said supporting plate 25 is preferably disposed at an angle to the horizontal so that the harrow is raised off the ground as it is swung on the pivot 24 in a clockwise direction. As shown in Fig. 2, it will be clearly seen that when the harrow is swung to the left of the tractor, it is raised high above the ground so that it will not operate and when the harrow is in such a position, the plow 8 may be operated independently of the harrow.

In order that the said harrow may be pulled by the tractor or the vehicle, there is provided a supporting frame 28 which preferably comprises a bar that extends around one of the wheels 5 and is secured to the axle housing 6 by means of a suitable bracket 29. This frame 28 has a supporting bracket 30 extending outwardly therefrom and connected thereto by means of a bar 31 to retain the said supporting bar in its operating position. A drawbar or bail 32 is swivelly secured to the frame 17 at 33 and to the end of an extension 34 that is adjustable in the said supporting bar 30 by means of a pin 35 which may be inserted through any of the openings 36 for adjusting the distance that the said extension 34 projects from the supporting bracket 30 in order to conform with the adjusted length of the supporting bar 20.

The harrow is also adjustable for height, on the supporting bar 20, by means of a pin 37 which may extend through any of the openings 38 in a bar 39 that extends through vertical housing 40.

In the operation of my invention, the harrow is first adjusted relatively to the plow, as shown in Fig. 3, and for height, depending upon the depth of the harrowing which is required.

The plow and the harrow are then pulled over the ground by means of the tractor in such a direction that the harrow will move over the furrow that has been previously plowed while the plow 7 is plowing a new furrow. This may be done by spiraling the travel of the tractor or by turning the tractor at the end of the furrow in the proper direction to bring the harrow in position above the previously plowed furrow. My invention may also be used in connection with automatically-steered tractors such as controlled by means of a device having a follower guided by a previously-formed furrow to steer the tractor so that it will continue in a direction parallel to the said furrow. In such cases, the direction-controlling device may be placed ahead of the harrow or in a furrow alongside of the furrow which is being harrowed.

It is to be understood that my invention is primarily for the purpose of providing a combined plow and harrow which will simultaneously plow and harrow the surface of the ground in such a manner that the tracks formed by the wheels of the tractor, or other drawing vehicle, will be harrowed over so that, after the said implement has passed, it will leave the ground plowed and evenly harrowed and without any wheel marks.

As illustrated in Fig. 3, the previously-cut furrows may run along the lines indicated at 41 and 42 so that, as the plow is cutting a new furrow, the wheel 5, between the plow and the harrow, may be running close to or over the furrow 41 while the harrow is harrowing the ground over the furrow 42 which was cut previously to the furrow 41. At the same time that the harrow is harrowing over the furrow 42, it is also harrowing the tracks left in or along side of said furrow 42 by the wheel 5. Therefore, as my improved implement is drawn over the ground, it cuts the successive parallel furrows in a direction running to the left from the direction in which the implement is drawn, and the harrow, being the last part of the mechanism of said implement passing over the ground, will leave the ground in an evenly-harrowed and trackless condition.

I claim:

1. A combined plow and harrow of the character described comprising in combination, a vehicle, a plow drawn by said vehicle, means supporting said plow on said vehicle and operable for raising and lowering of the plow relatively to the ground, a harrow drawn by said vehicle and disposed at one side of the plow, a connection between the plow and harrow for raising and lowering of the harrow with the plow, a supporting plate carried with said plow and disposed on an angle, a bar swivelly secured to the center of said plate and rotatable upon an axis thereon to different positions relatively to the plow, and means on said plate for retaining the harrow in said positions; said plate causing said harrow to be raised as the harrow is moved about the said axis.

2. An implement of the character described combining a plow and a harrow and comprising a tractor having a pair of wheels, a supporting frame movably connected to said vehicle, a plow carried by said frame, means for raising and lowering said plow relatively to the ground, a plate carried with said plow at an angle to the horizontal, a bar swivelly connected to the center of said plate and adapted to be rotated about its said axis, means for securing said bar in different positions upon said plate, a harrow carried at the end of said bar at one side of said plow, a frame secured to the tractor and extending to the outer side of a wheel thereof, a bracket adjustably secured to the outer side of said frame, and a drawbar swivelly secured to said bracket and swivelly connected to the harrow for drawing said harrow; the said plate being adapted to cause raising of said harrow as it is moved to different positions about the said axis and with relation to the plow.

3. An implement of the character described combining a plow and a harrow and comprising a tractor having a pair of wheels, a frame secured to the tractor and extending to the outer side of one of said wheels, a bracket adjustably secured to said frame and extending laterally therefrom away from said wheel, a harrow, a connection between said harrow and bracket, means for supporting said harrow, said means including a plate carried by the tractor, an arm swivelly connected to the plate and extending therefrom, and means for suspending the harrow from the end of said arm, the said arm being movable about said plate for supporting the harrow in different positions relatively thereto and the said plate being disposed at an angle whereby the said harrow will be raised relatively to the ground as it is swung from one side of the harrow to the other.

4. A combined plow and harrow comprising a vehicle, a supporting member movably mounted upon the vehicle, a plow carried by said member, a harrow, a supporting plate secured to said supporting member and disposed at an angle thereto, a supporting bar pivoted to said plate and supporting said harrow in spaced position relatively to the plow, and means on said plate for locating the harrow in different positions, relatively to the plow; said plate causing the harrow to be raised when the supporting bar is moved in one direction and to be lowered when the supporting bar is moved in the opposite direction.

CLARENCE M. ELLISON.

REFERENCES CITED

The following references are of record in the file of this patent:

UNITED STATES PATENTS

| Number | Name | Date |
|---|---|---|
| 890,184 | Seitner | June 9, 1908 |
| 983,382 | Mahan | Feb. 7, 1911 |
| 1,122,837 | Young | Dec. 29, 1914 |
| 1,225,400 | Black | May 8, 1917 |
| 1,615,679 | Bruning | Jan. 25, 1927 |
| 1,776,176 | Ashenhurst | Sept. 16, 1930 |
| 2,356,231 | Ferguson | Aug. 22, 1944 |

FOREIGN PATENTS

| Number | Country | Date |
|---|---|---|
| 555,428 | Germany | July 25, 1932 |